United States Patent
Spielmann et al.

(10) Patent No.: US 6,843,141 B2
(45) Date of Patent: Jan. 18, 2005

(54) HAND-HELD POWER TOOL WITH A TORQUE CUT-OFF DEVICE

(75) Inventors: David Spielmann, Geltendorf (DE); Christian Laube, Untererendingen (CH); Armin Breitenmoser, Ulisbach (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/612,350

(22) Filed: Jul. 2, 2003

(65) Prior Publication Data

US 2004/0069511 A1 Apr. 15, 2004

(30) Foreign Application Priority Data

Jul. 3, 2002 (DE) .......................................... 102 29 748

(51) Int. Cl.[7] .............................................. B25B 23/14
(52) U.S. Cl. ................... 73/862.21; 73/862; 73/862.06; 73/862.191; 173/176
(58) Field of Search .............................. 73/862, 862.21; 173/93.5, 176–183

(56) References Cited

U.S. PATENT DOCUMENTS 3,666,021 A * 5/1972 Whitehouse ................. 173/180
4,403,532 A * 9/1983 Wallace et al. ............... 81/483

* cited by examiner

Primary Examiner—Edward Lefkowitz
Assistant Examiner—Alandra Ellington
(74) Attorney, Agent, or Firm—Sidley Austin Brown & Wood, LLP

(57) ABSTRACT

A hand-held power tool includes a torque cut-off device (2) for presetting a torque of the driving shaft (3) of the hand-held power tool and formed as a control device (4) having a rotatable control sleeve (5) including a control cam (6) having at least two cam sections (6a, 6b), and a control element (7) secured in the housing (1) of the power tool without a possibility of rotation but with a possibility of an axial displacement relative to a rotational axis (D) of the control sleeve (5) and having at least two probing sections (8a, 8b) cooperating with respective cam sections (6a, 6b) for presetting the torque.

5 Claims, 4 Drawing Sheets

HAND-HELD POWER TOOL WITH A TORQUE CUT-OFF DEVICE

BACKGROUND OF THE INVENTION

1. Field of the Invention

The present invention relates to a hand-held power tool such as, e.g., a screw driving tool or the like, and including a housing, a motor-driven shaft for driving a working tool and extending in the housing, and a torque cut-off device for presetting a torque of the driving shaft and having a rotatable control sleeve with a control cam and a control element secured in the housing without a possibility of rotation but with a possibility of an axial displacement relative to a rotational axis of the control sleeve and cooperating with the control sleeve for presetting the torque of the drive shaft.

2. Description of the Prior Art

Hand-held power tools and, in particular, screw driving tools, of the type described above are usually provided with torque cut-off means in order to prevent, e.g., a motor for driving the tool from overload or a screw from being damaged. The torque cut-off means generally includes a control device for presetting the torque. For its actuation, the control device is provided with a rotatable control sleeve having a control cam. The control device is also used for actuation and deactuation of a percussion mechanism and the like. A screw driving tool is provided, e.g., with a ratchet clutch the engagement position of which is insured by a spring acting in the axial direction of the clutch.

Generally, hand-held power tools, in particular screw driving tools having a housing and a torque cut-off device are known. The torque cut-off device has, for presetting a torque of a motor-driven shaft for driving a working tool, a control device including a control sleeve. The control sleeve has a control cam probed by a control element that is secured in the housing without a possibility of rotation but with a possibility of axial displacement with respect to the rotational axis of the control sleeve for presetting the torque. In order to insure a precise and stable position of the control sleeve on the housing, the control element has at least two probing sections which contact the control cam and are uniformly arranged over the circumference of the control cam.

The drawback of the device discussed above consists in that the two probing sections do not insure a precise presetting of a torque as the control sleeve, which cooperates with the two probing sections, rotates maximum by 180°. With the use of more than two probing sections, the angular region of rotation of the control sleeve is correspondingly reduced.

Accordingly, an object of the present invention is to provide a torque cut-off device that can be economically manufactured and, at the same time, would insure a precise and minute presetting of a torque.

SUMMARY OF THE INVENTION

This and other objects of the present invention, which will become apparent hereinafter, are achieved by providing a control device the control sleeve of which has at least two control cams and the control element of which has at least two probing sections which cooperate with respective control cams.

The provision of a control element having at least two probing sections insures a precise and stable positioning of the control element. Further, forming the control cam of two cam sections which cooperate with respective probing sections of the control element, permits to use the entire circumference of the cam section, which cooperates with a respective probing section of the control element, for presetting a torque, which insures a minute presetting of the torque. In hand-held power tools with high torques, minute division and precise presetting of the torque is of a paramount importance.

Advantageously, in order to provide for a maximum rotational region of the control sleeve, the cam sections of the control cam extend each over about 360° around the rotational axis f the control sleeve. With the control sleeve having a plurality of locking positions, a convenient and precise presetting of a torque is insured.

In order to provide for a compact structure of the torque cut-off device, advantageously, the cam sections are formed as annular sections coaxial with each other. The coaxial alignment of the cam sections with respect to the rotational axis of the control sleeve insures a simple guiding of the probing sections with respect to the rotatable, on the housing, control sleeve.

The cam sections act, advantageously, parallel to a longitudinal direction of the driving shaft of the power tool. This insures a constructively simple transmission of a force, e.g., to the ratchet clutch.

In order to insure an economical manufacturing of the control sleeve, the control cam, as discussed above, is formed of two cam sections and the control element is formed of two probing sections which are arranged opposite each other and contact respective cam sections.

For positioning of the control element on the housing, the control element includes a connection member supported about the rotational axis of the control sleeve.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
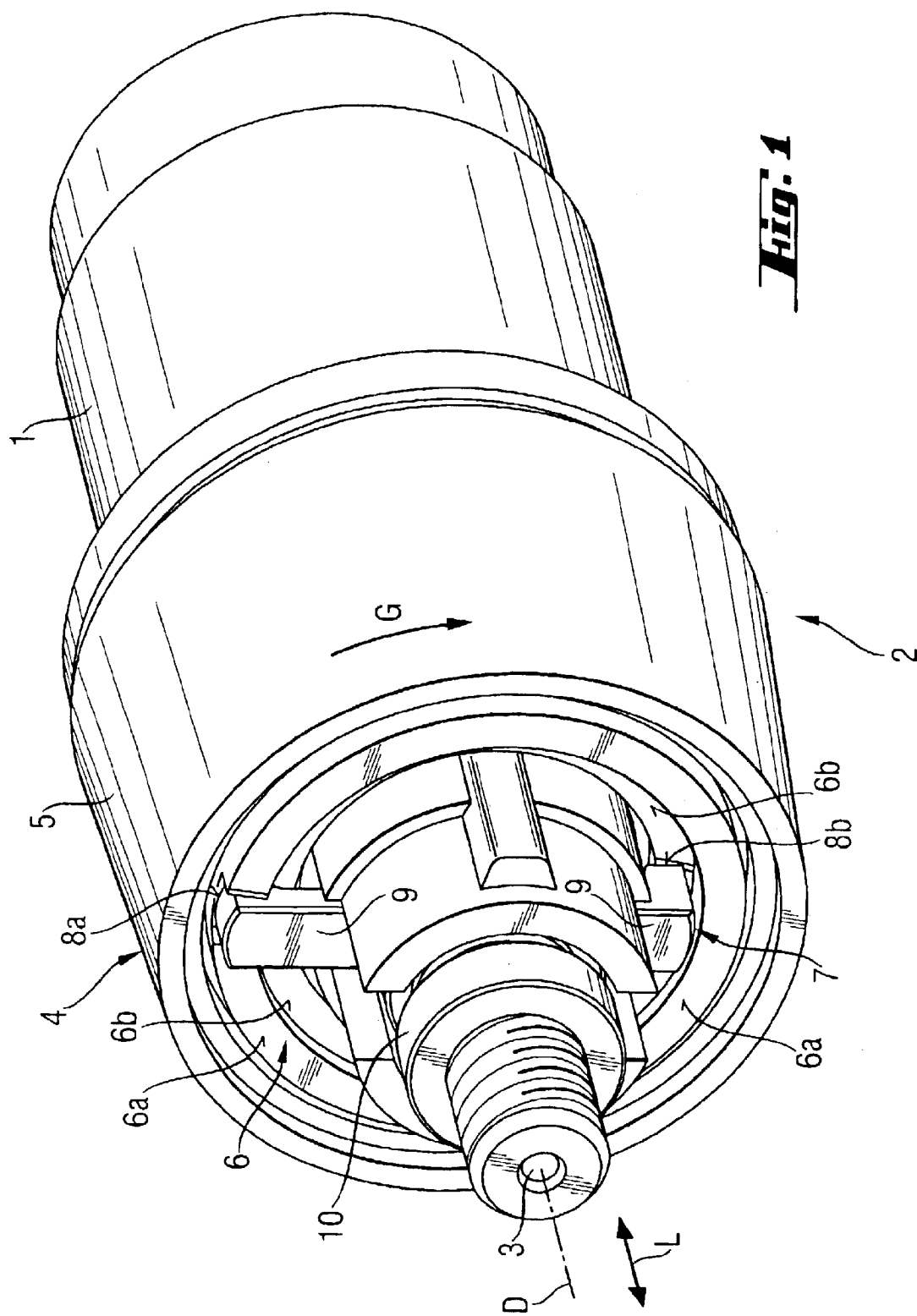
FIG. 1 a perspective view of a portion of a hand-held power tool according to the present invention with a torque cut-off device in its initial position.

A hand-held power tool according to the present invention, in particular, a screw driving tool, which is shown in FIGS. 1 through 4, includes a housing 1 and a torque cut-off device 2 formed as a control device 4 for presetting a torque of a motor-driven shaft 3 for driving a working tool (not shown). The hand-held power tool further includes a chuck 13 for releasably receiving the working tool, and a ratchet percussion mechanism 12 for generating axial impacts acting along a rotational axis D of the driving shaft 3.

The control device 4 has a control sleeve 5 rotatable about the rotational axis D and having a control cam 6 that, for presetting a torque, is engage by a control element 7 secured in the housing 1 without a possibility of rotation but with a possibility of axial displacement along the rotational axis D. the control cam 6 has two cam sections 6a, 6b, and the control element 7 has two probing sections 8a, 8b which cooperate with respective cam sections 6a, 6b the cam sections 6a, 6b extend each over about 360° around the rotational axis D of the control cam 6. The cam sections 6a, 6b are formed as annular members arranged about the rotational axis D coaxially with each other. The cam sections 6a, 6b act parallel to the longitudinal direction L of the driving shaft 3. The control element 7 has a connection portion 9 and a support portion 10 that supports the connection portion 9 on the shaft 3. The connection portion 9 has two, opposite, free ends on which the two probing section 8a, 8b are arranged, respectively, which cooperate with the respective cam sections 6a, 6b in the longitudinal direction L of the shaft 3.

Figure 2:
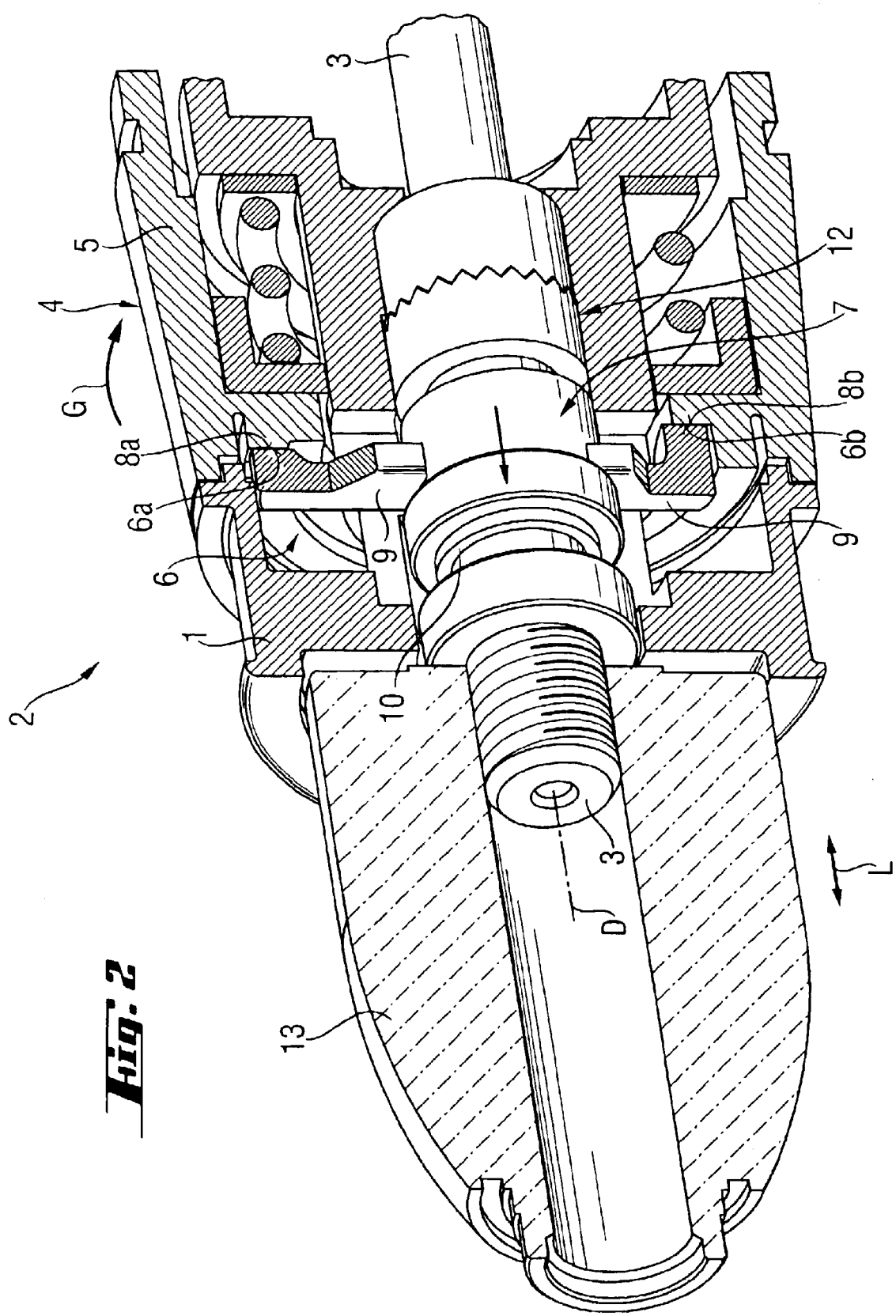
FIG. 2 a perspective, longitudinal cross-sectional view of the hand-held power tool shown in FIG. 1 with the torque cut-off device in its initial position.
Figure 3:
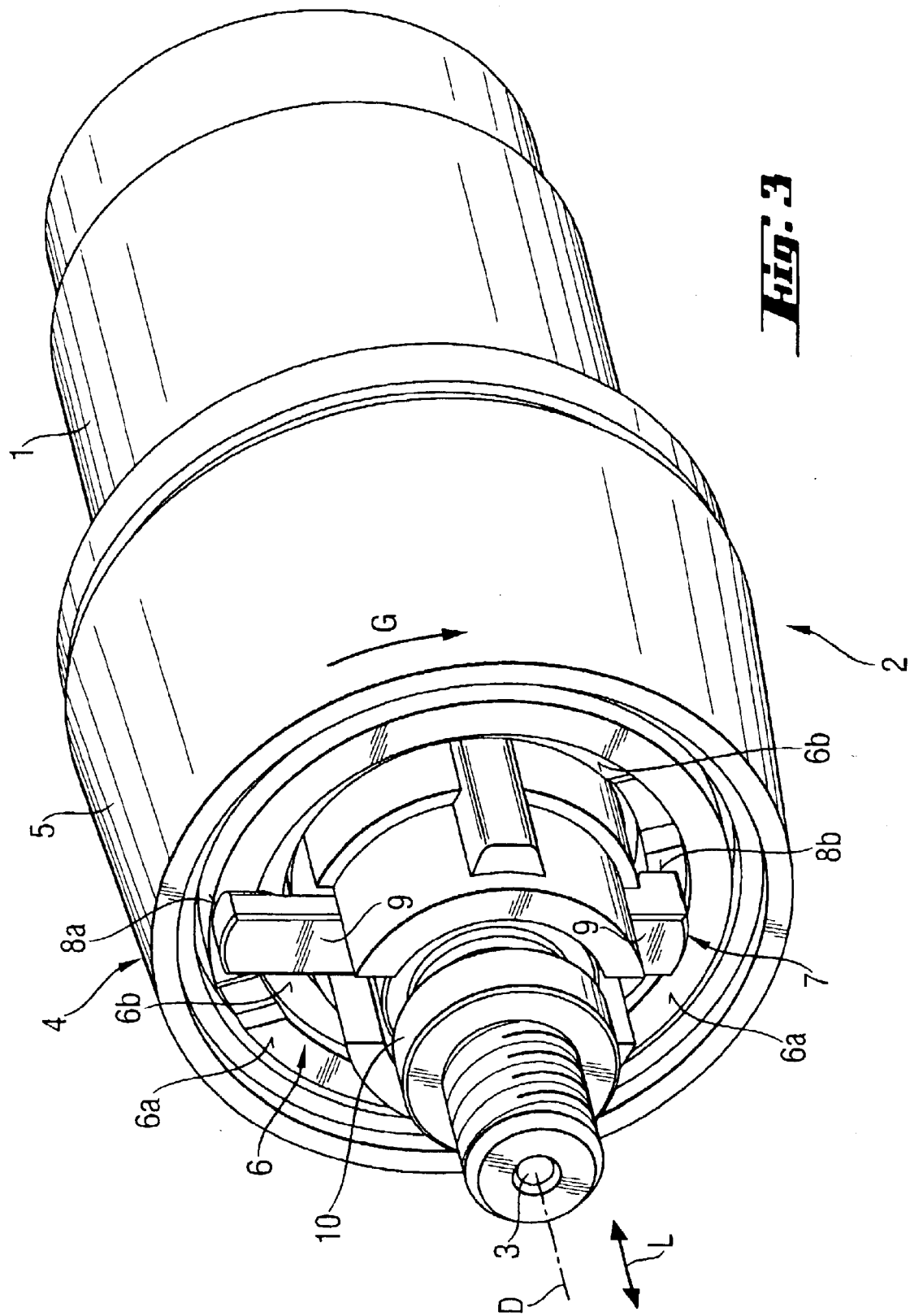
FIG. 3 a perspective view of the portion of the hand-held power tool shown in FIG. 1 with a torque cut-off device in its intermediate position.
Figure 4:
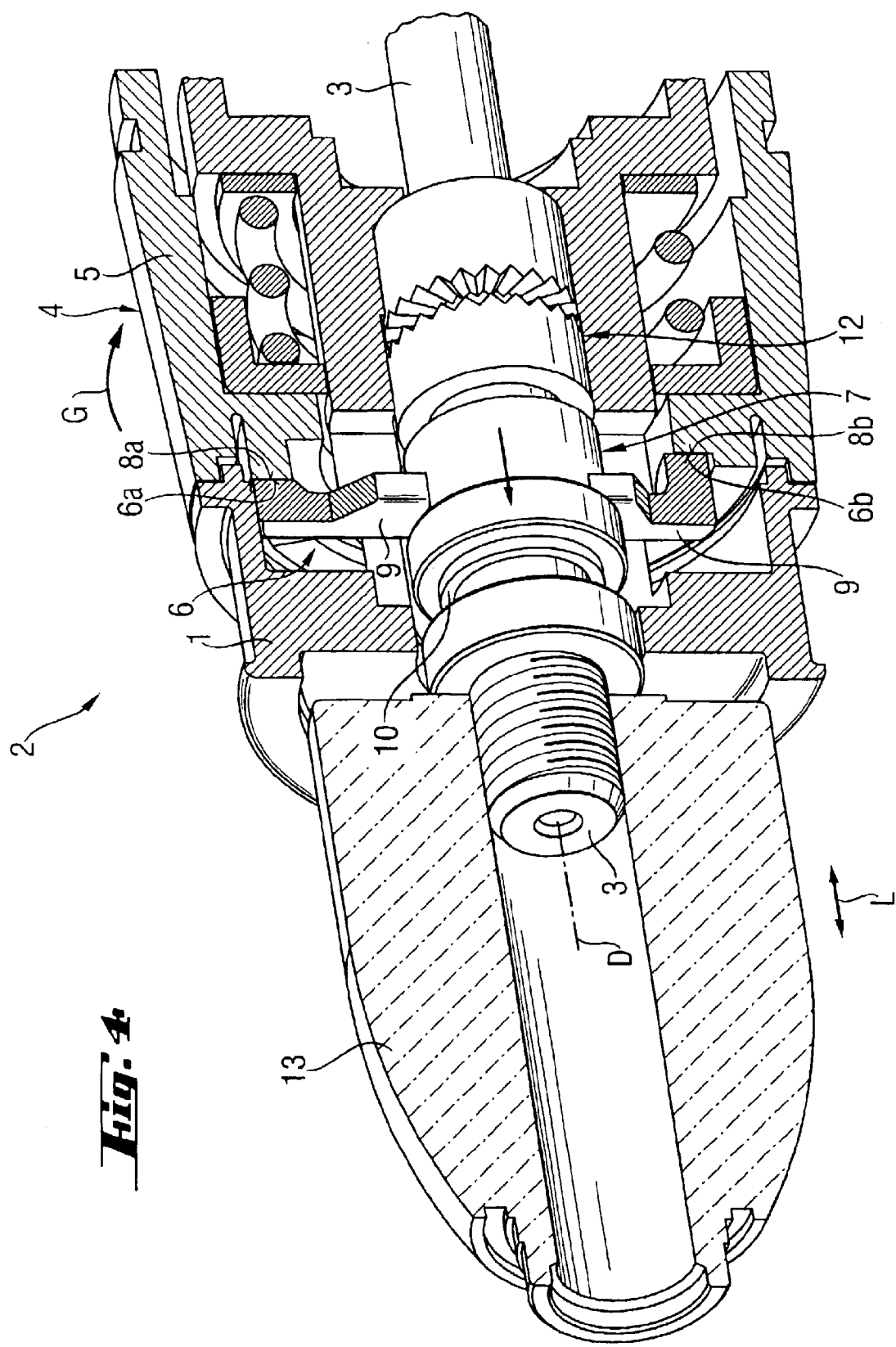
FIG. 4 a perspective, longitudinal cross-sectional view of the hand-held power tool shown in FIG. 1 with the torque cut-off device in its intermediate position.

Upon rotation of the control sleeve 5, of which the control cam 6 forms an integral part, the shaft 3 is displaced axially. In the initial position of the torque cut-off device 2 which is shown in FIGS. 1–2, the ratchet percussion mechanism 12 is actuated, and the available torque is at its maximum. Upon rotation of the control sleeve 5 in the direction of the arrow G, as shown in FIGS. 3–4, the ratchet percussion mechanism 12 is deactuated, and the preset torque is reduced. The cam sections 6a 6b form, in a direction opposite the direction of the arrow G, at the working tool side, raised ramps which, during rotation of the control sleeve 5, cause an axial displacement of the shaft 3 and, thereby, the reduction of the preset torque of the torque cut-off device 2.

Accordingly, though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held power tool, comprising a housing (1); a motor-driven shaft (3) for driving a working tool and extending in the housing (1); and a torque cut-off device (2) for presetting a torque of the driving shaft (3) and having a control device (4), the control device (4) having a rotatable control sleeve (5) with a control cam (6) having at least two cam sections (6a,6b) and a control element (7) secured in the housing (1) without a possibility of rotation but with a possibility of an axial displacement relative to a rotational axis (D) of the control sleeve (5) and including at least two probing sections (8a,8b) located opposite each other and contacting respective cam sections (6a,6b) for presetting the torque of the driving shaft, wherein the control element (7) has a connection portion (9) supported about the rotational axis (D) for supporting the probing sections (8a,8b).

2. A hand-held power tool according to claim 1, wherein the cam sections (6a, 6b) extend, respectively, about the rotational axis (D) of the control sleeve (5) over an angle of 360°.

3. A hand-held power tool according to claim 1, wherein the cam sections (6a, 6b) are formed as annular sections coaxial with each other and are arranged about the rotational axis (D).

4. A hand-held power tool according to claim 1, wherein cam sections 6a, 6b) act parallel to a longitudinal direction (L) of the shaft (3).

5. A torque cut-off device (2) for presetting a torque of a driving shaft (3) of a hand-held power tool, comprising a control device (4) having a rotatable control sleeve (5) with a control cam (6) having at least two cam sections (6a,6b), and a control element (7) secured in a housing (1) of the hand-held tool without a possibility of rotation but with a possibility of an axial displacement relative to a rotational axis (D) of the control sleeve (5) and including at least two probing sections (8a,8b) located opposite each other and contacting respective cam sections (6a,6b) for presetting the torque, wherein the control element (7) has a connection portion (9) supported about the rotational axis (D) for supporting the probing sections (8a,8b).

\* \* \* \* \*